United States Patent
Konakawa et al.

(10) Patent No.: US 7,856,812 B2
(45) Date of Patent: Dec. 28, 2010

(54) EXHAUST DEVICE OF EIGHT-CYLINDER ENGINE

(75) Inventors: Tsugunori Konakawa, Shizuoka-ken (JP); Yoshihiko Atsumi, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 722 days.

(21) Appl. No.: 11/828,851

(22) Filed: Jul. 26, 2007

(65) Prior Publication Data

US 2008/0022671 A1   Jan. 31, 2008

(30) Foreign Application Priority Data

Jul. 26, 2006  (JP) .............................. 2006-203676

(51) Int. Cl.
*F01N 1/00* (2006.01)

(52) U.S. Cl. .............................. 60/323; 60/289; 60/293; 60/313; 60/322; 60/324; 440/88 G; 440/88 J; 440/89 R; 440/89 C; 440/89 H

(58) Field of Classification Search ................ 60/289, 60/293, 299, 305, 313, 322, 323, 324; 440/88 G, 440/88 J, 89 R, 89 C, 89 H See application file for complete search history.

(56) References Cited

U.S. PATENT DOCUMENTS

| 2,926,647 | A | * | 3/1960 | Welch .................. 123/547 |
| 3,708,980 | A | * | 1/1973 | Truxell ................. 60/274 |
| 4,197,704 | A | * | 4/1980 | Date et al. ............. 60/322 |
| 5,351,481 | A | * | 10/1994 | Flugger ................. 60/273 |
| 5,471,835 | A | * | 12/1995 | Friedman ............... 60/293 |
| 6,962,049 | B2 | * | 11/2005 | Ashida et al. ........... 60/323 |
| 7,634,908 | B2 | * | 12/2009 | Chu .................... 60/323 |

FOREIGN PATENT DOCUMENTS

JP   2000-265836 A   9/2000

* cited by examiner

*Primary Examiner*—Binh Q. Tran
(74) *Attorney, Agent, or Firm*—Keating & Bennett, LLP

(57) ABSTRACT

An exhaust device of an eight-cylinder engine can include first to eighth cylinders and a manifold. The first to eighth cylinders are ignited in that order. The exhaust manifold includes first to eighth upstream exhaust pipes extending respectively from the first to eighth cylinders. The first to fourth midway exhaust pipes can extend respectively from a joined portion of the first and fifth upstream exhaust pipes, a joined portion of the second and sixth upstream exhaust pipes, a joined portion of the third and seventh upstream exhaust pipes, and a joined portion of the fourth and eighth upstream exhaust pipes. A downstream exhaust pipe can connect extended ends of the first to fourth midway exhaust pipes to the ambient atmosphere.

12 Claims, 14 Drawing Sheets

EXHAUST DEVICE OF EIGHT-CYLINDER ENGINE

PRIORITY INFORMATION

This application is based on and claims priority to Japanese Patent Application No. 2006-203676, filed Jul. 26, 2006, the entire contents of which is hereby expressly incorporated by reference.

BACKGROUND OF THE INVENTIONS

1. Field of the Inventions

The present inventions relate to an exhaust devices, for example, exhaust devices that can be used for eight-cylinder engines in which exhaust pipes extending respectively from first to eighth cylinders are routed according to the order of ignitions of the respective cylinders to prevent interference.

2. Description of the Related Art

Japanese Patent Document JP-A-2000-265836 discloses a known exhaust device of a multicylinder engine. In this exhaust device, one set of exhaust passages is connected to the odd-fired cylinders and another set of exhaust passages is connected to the even-fired cylinders. Each of these sets respectively merge into first and second downstream passages. The first and second downstream passages then merge together to form a single exhaust passage. With this structure, exhaust is pulsed from the cylinders in a serial manner, thereby preventing from interference between the pulses, thereby enhancing performance of the engine.

SUMMARY OF THE INVENTION

The engine described in Japanese Patent Document JP-A-2000-265836 is used as a drive source for an outboard motor. It is generally desirable to make the engines of outboard motors as small as possible to reduce the aerodynamic drag created by the outboard motor, as well as for other reasons. To make such engines more compact, the length of the exhaust passages can be shortened. In this case, the cylinders subjected to odd-numbered explosions, which occur prior, and the cylinders subjected to even-numbered explosions, which occur later and subsequently to the former, will be positioned in proximity to each other because of the length of the shortened exhaust passages described above.

As a result, exhausts from the cylinders subjected to later explosions tend to interfere with exhausts from the cylinders subjected to prior explosions. Thus, in the exhaust passages extending from the cylinders subjected to earlier explosions, desired exhaust pulses having a sufficiently high negative pressure may not be obtained.

When the negative pressure of exhaust pulses is not sufficiently high as described above, the exhaust is not released properly from the cylinders. This causes a knocking due to the burnt gas left in the cylinders, a misfiring, increased pumping losses, and decreased volumetric efficiency due to an improper intake of fresh air. As a result, engine output, fuel economy and exhaust efficiency may decrease.

Thus, in accordance with an embodiment, an exhaust device of an eight-cylinder engine in which the first, second, third, fourth, fifth, sixth, seventh, and eighth cylinders are ignited in that order. The exhaust device can comprise an exhaust manifold extending from the first, second, third, fourth, fifth, sixth, seventh, and eighth cylinders. The exhaust manifold can comprise first, second, third, forth, fifth, sixth, seventh, and eighth upstream exhaust pipes extending respectively from the first, second, third, fourth, fifth, sixth, seventh, and eighth cylinders. First, second, third, and fourth midway exhaust pipes can extend respectively from a joined portion of extended ends of the first and fifth upstream exhaust pipes, a joined portion of extended ends of the second and sixth upstream exhaust pipes, a joined portion of extended ends of the third and seventh exhaust pipes, and a joined portion of extended ends of the fourth and eighth upstream exhaust pipes. Additionally, a downstream exhaust pipe for connecting extended ends of the first, second, third, and fourth midway exhaust pipes to the ambient atmosphere.

In accordance with another embodiment, an engine can comprise first, second, third, fourth, fifth, sixth, seventh, and eighth cylinders. An exhaust manifold can extend from the first, second, third, fourth, fifth, sixth, seventh, and eighth cylinders. The exhaust manifold can comprise first, second, third, fourth, fifth, sixth, seventh, and eighth upstream exhaust pipes extending respectively from the first, second, third, fourth, fifth, sixth, seventh, and eighth cylinders. First, second, third and fourth midway exhaust pipes can extend respectively from a first joined portion of ends of the first and fifth upstream exhaust pipes, a second joined portion of ends of the second and sixth upstream exhaust pipes, and a third joined portion of ends of the third and seventh upstream exhaust pipes, and a fourth joined portion of ends of the fourth and eighth upstream exhaust pipes. Additionally, a downstream exhaust pipe connecting extended ends of the first, second, third, and fourth midway exhaust pipes to the ambient atmosphere.

BRIEF DESCRIPTION OF THE DRAWINGS

The above-mentioned and other features of the inventions disclosed herein are described below with reference to the drawings of the preferred embodiments. The illustrated embodiments are intended to illustrate, but not to limit the inventions. The drawings contain the following Figures.

DETAILED DESCRIPTION OF THE PREFERRED EMBODIMENT

Improved exhaust systems for an engine 11 (FIG. 1) are disclosed herein. Although the present exhaust systems are illustrated and described in the context of an outboard motor, certain aspects of the present inventions can be used with engines of other types of vehicles, as well as with other types of prime movers.

In some embodiments, the exhaust system can be configured for an eight-cylinder engine which can prevent mutual interference of exhausts from respective cylinders, thereby providing enhanced performance of the engine more reliably. In some embodiments, the engine 11 can include first to eighth cylinders and an exhaust manifold extending from the first to eighth cylinders.

Figure 1:
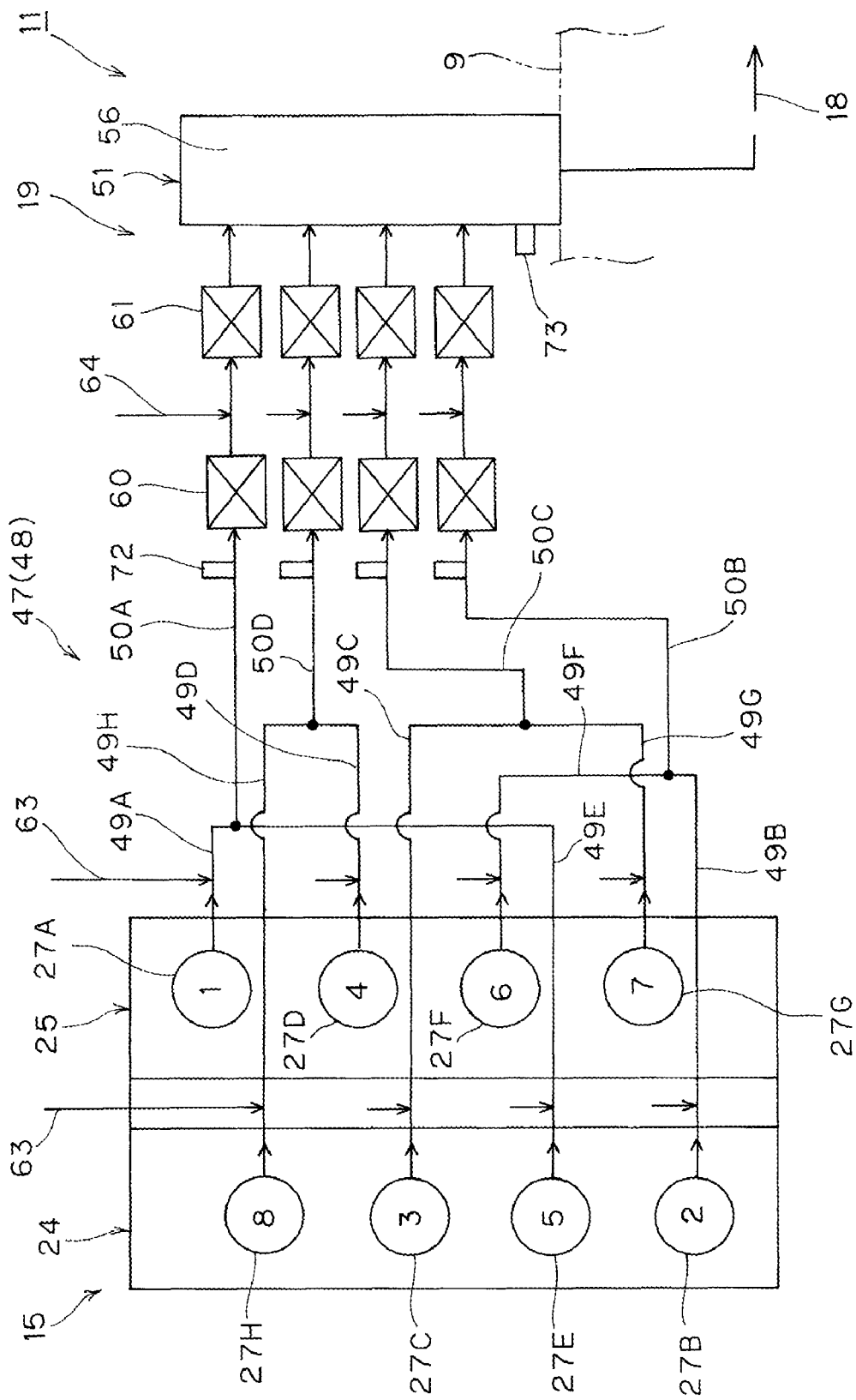
FIG. 1 is a schematic diagram generally illustrating an engine in accordance with an embodiment.

With reference to FIG. 1, the first to eighth cylinders can be ignited in that order. The exhaust manifold can include first to eighth upstream exhaust pipes extending respectively from the first to eighth cylinders. First to fourth midway exhaust pipes can extend respectively from joined portions of extended ends of the first and fifth upstream exhaust pipes, a joined portion of extended ends of the second and sixth upstream exhaust pipes, a joined portion of extended ends of the third and seventh upstream exhaust pipes, and a joined portion of extended ends of the fourth and eighth upstream exhaust pipes. A downstream exhaust pipe can connect extended ends of the first to fourth midway exhaust pipes to the ambient atmosphere.

Figure 2:
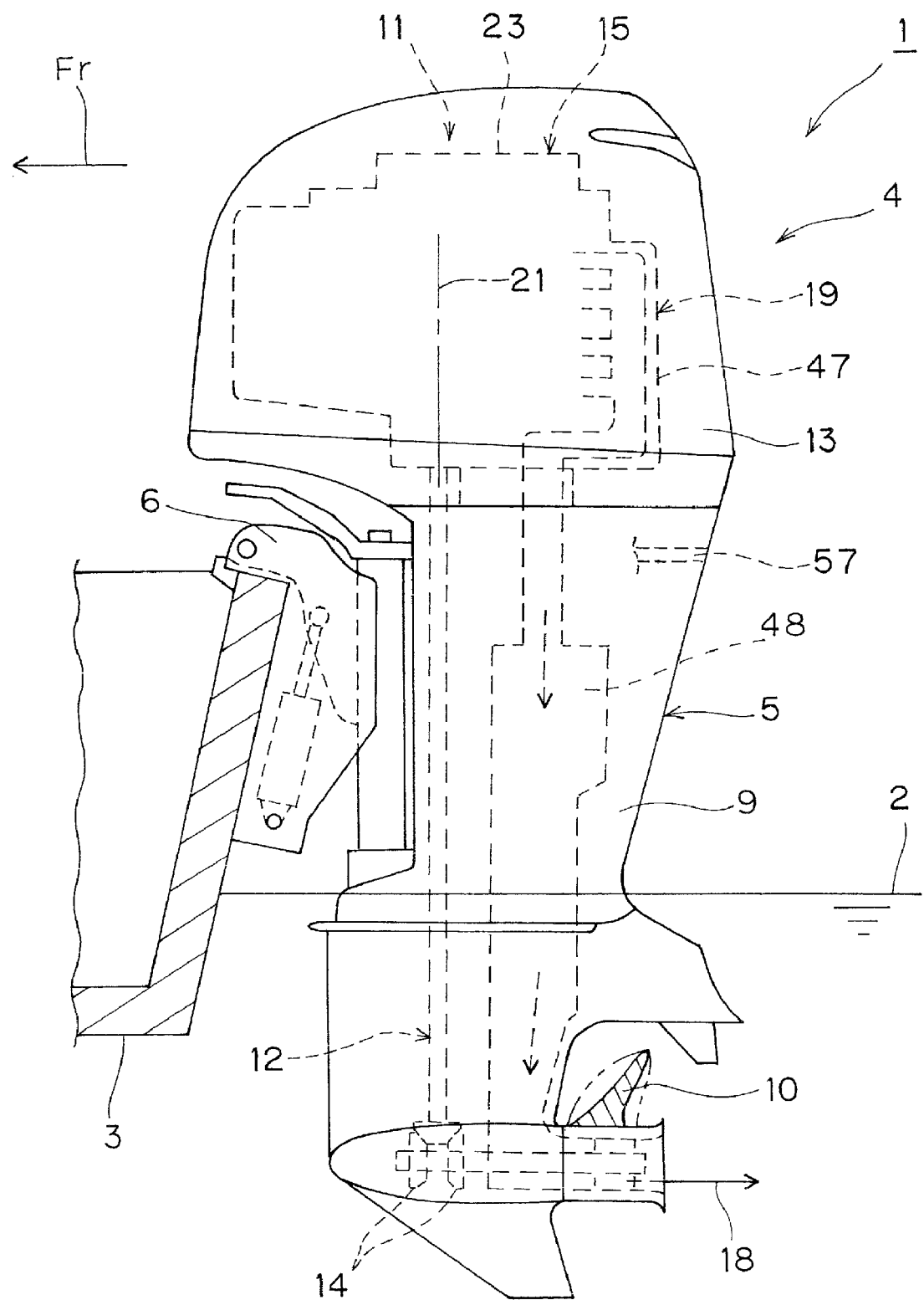
FIG. 2 is a schematic side view of a rear part of a watercraft including an outboard motor which, in turn, can include the engine of FIG. 1.

Referring to FIG. 2, a watercraft 1 can be designed to float on the surface of water 2 such as the sea. The arrow Fr indicates the forward direction in which the watercraft 1 can be driven.

The watercraft 1 can include a hull 3 designed to float on the surface of the water 2, and an outboard motor 4 supported at the stern of the hull 3. The outboard motor 4 can include an outboard motor body 5 for producing propulsive force to selectively drive the hull 3 forward or rearward, and a bracket 6 for supporting the outboard motor body 5 on the hull 3.

The outboard motor body 5 can include a case 9, a propeller 10, an engine 11, a power transmission apparatus 12 and a cowling 13. The case 9 can extend generally vertically, and can be supported on the hull 3 by the bracket 6.

A lower portion of the case 9 can be designed to be submerged in the water 2. The propeller 10 is supported at the lower end of the case 9. The engine 11 is supported at the upper end of the case 9. The power transmission apparatus 12 is enclosed in the case 9, and operatively connects the propeller 10 to the engine 11. The cowling 13 selectively covers and uncovers the engine 11 on the outside thereof.

The power transmission apparatus 12 can include a gear switching device 14 for changing the driving state of the propeller 10 between a forward drive mode, a reverse drive mode and a neutral mode, through a user's manual operation. The operation of the switching device 14 allows the hull 3 to be selectively driven either forward or rearward, or to be allowed to drift, during operation of the engine 11.

Referring to FIGS. 1 to 6, the engine 11 can be a four-stroke, V-type, eight-cylinder engine, and can be used as a drive source for the outboard motor 4. However, this is merely one type of engine that can be used. Those skilled in the art readily appreciate that the present exhaust systems and exhaust components can be used with any of a variety of engines having other numbers of cylinders, and/or other cylinder arrangements, and/or operating on other principles of operation (diesel, 2-stroke, rotary, etc.).

The engine 11 can include an engine body 15, an intake device 17 and an exhaust device 19. The engine body 15 can be supported on the top of the case 9.

The intake device 17 can be configured to supply a mixture of ambient air 16 and fuel to the engine body 15 for combustion therein. The exhaust device 19 guides the burnt gases resulting from the combustion to the outside of the engine 11 as exhaust 18.

The engine body 15 can include a crankcase 23 and left and right banks 24 and 25 of cylinders. The crankcase 23 can be supported on the top of the case 9, and can support a crankshaft 22 for rotation about a generally vertical axis 21.

Figure 3:
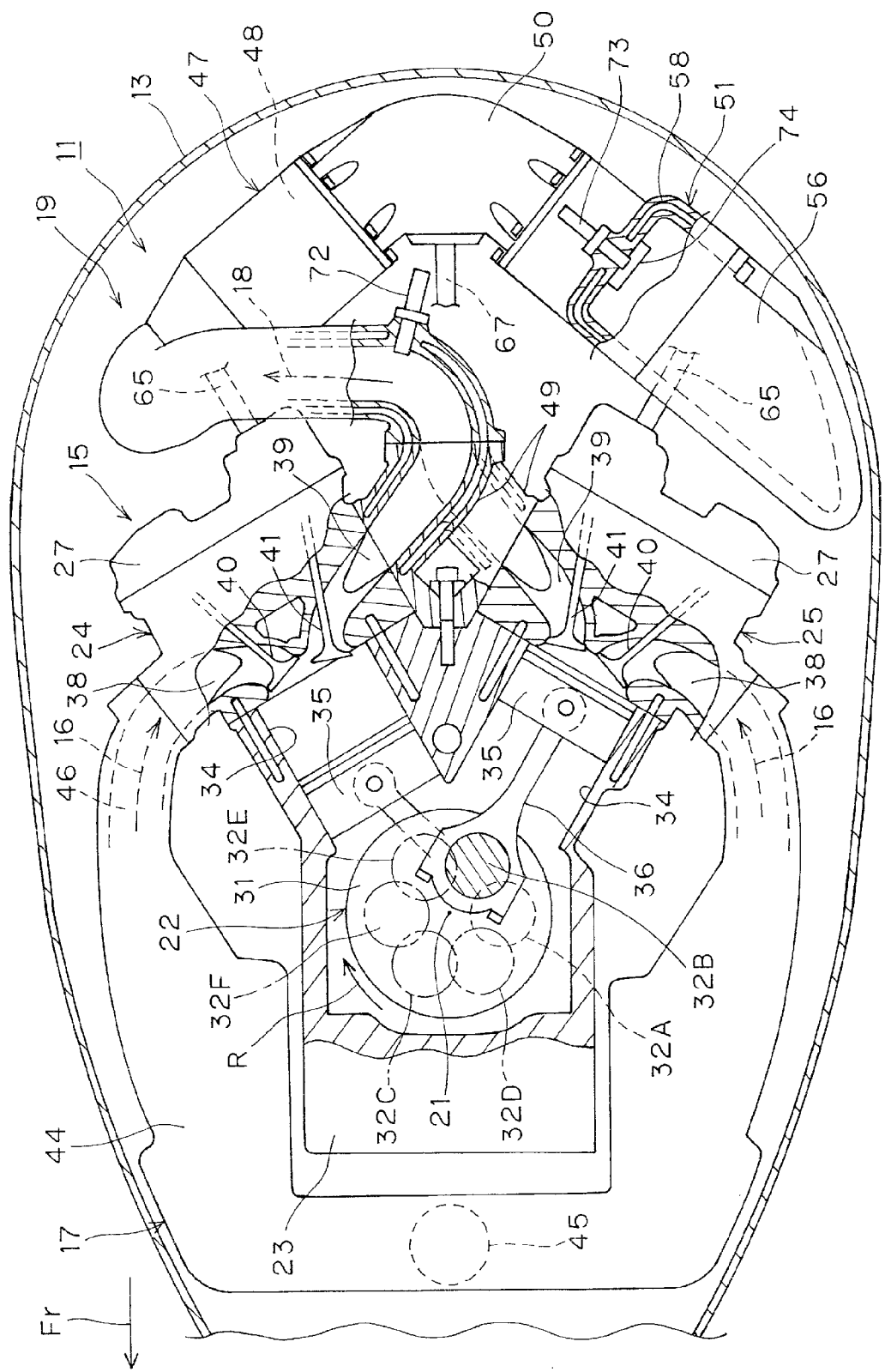
FIG. 3 is a partial cross-sectional view of the bottom of the engine.
Figure 4:
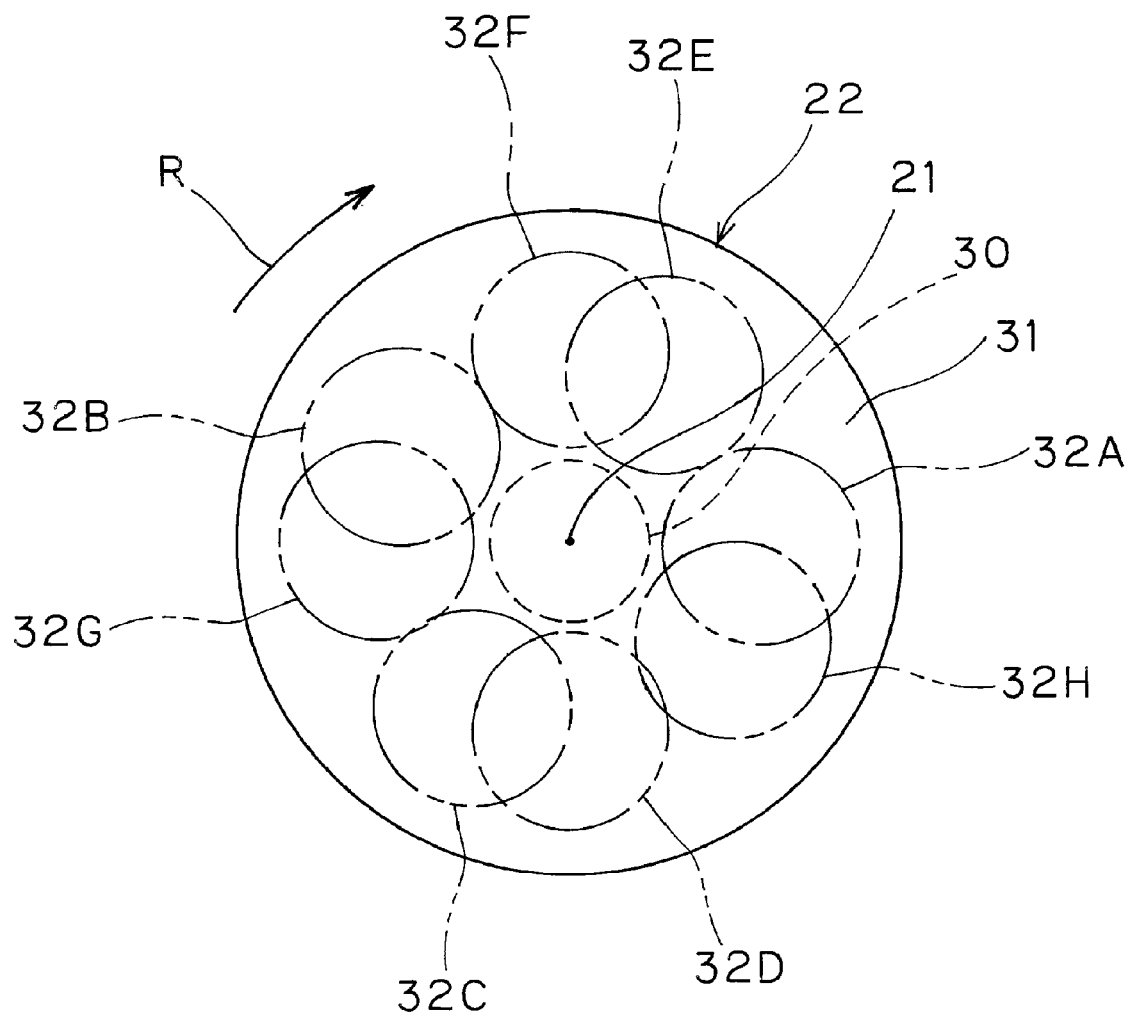
FIG. 4 is an enlarged detailed sectional view of a portion of FIG. 3.
Figure 5:
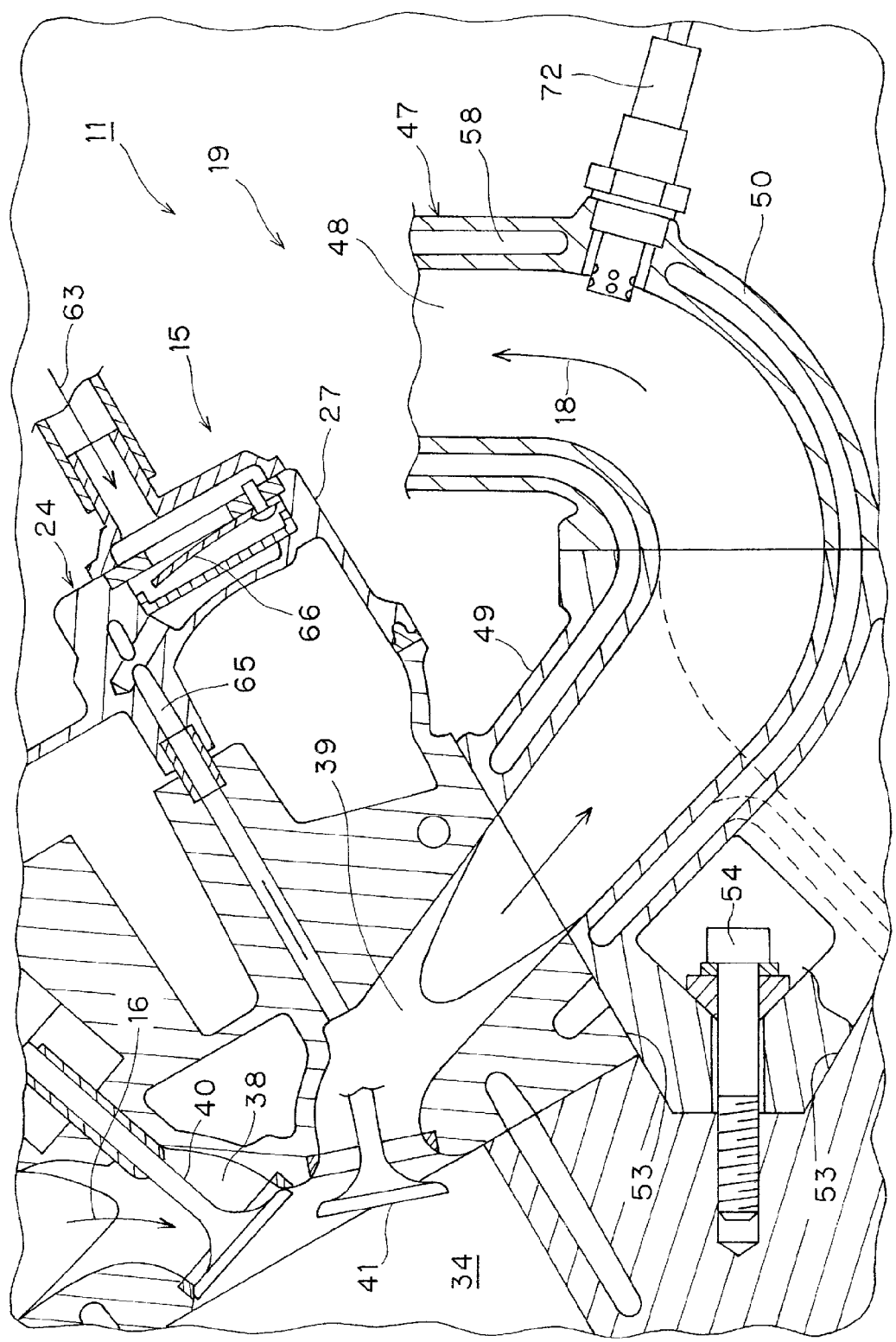
FIG. 5 is an enlarged detailed sectional view of a portion of FIG. 3.
Figure 6:
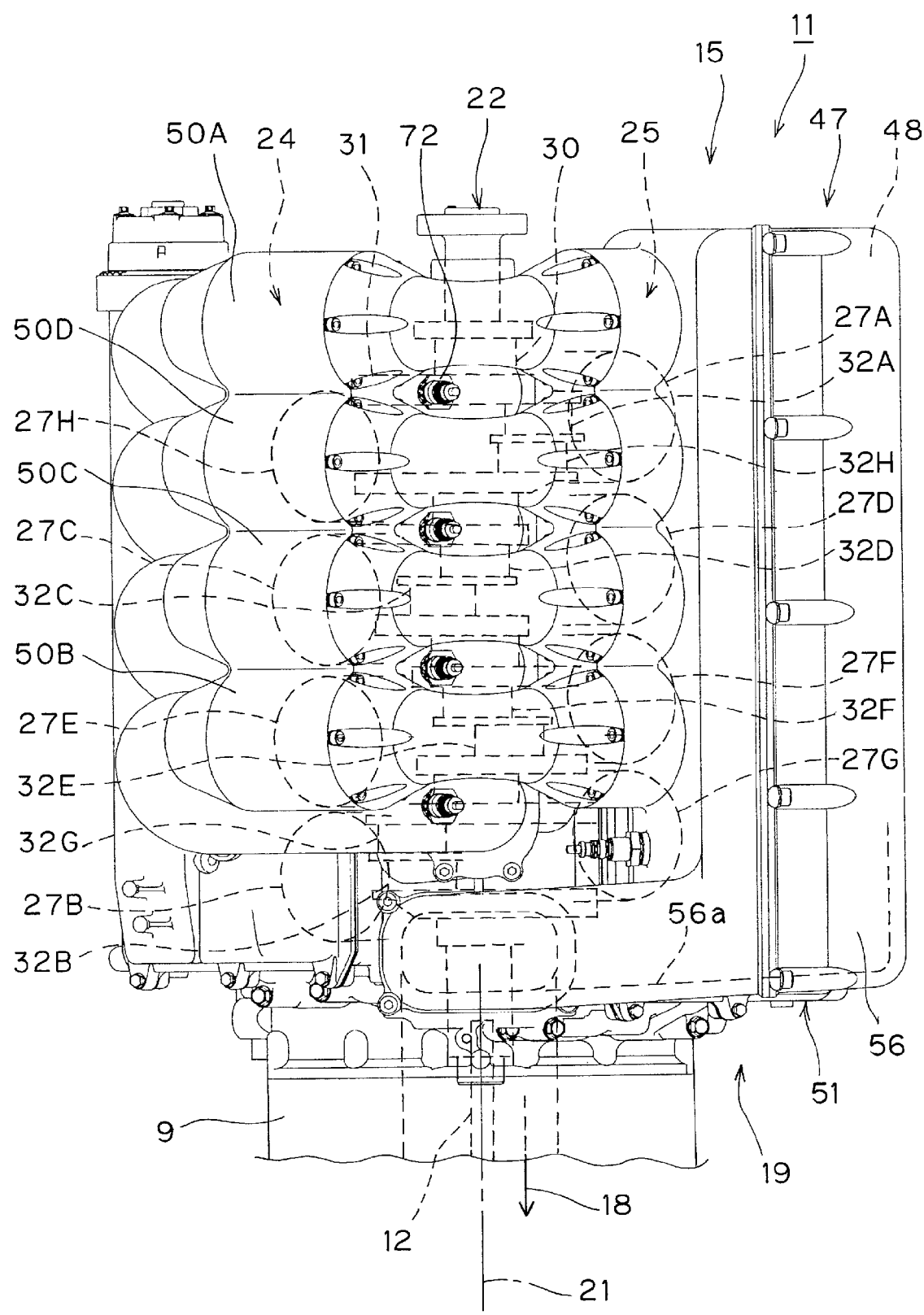
FIG. 6 is a rear elevational view of the engine.

The left and right banks 24 and 25 can project generally horizontally toward the outside, or rearwardly and toward the sides. Additionally, the left and right banks 24 and 25 can project from the crankcase 23 in a V-configuration as viewed in the bottom view of the engine 11 (FIG. 3). In such embodiments, the angle made by the banks 24, 25, for example by first to sixth cylinders 27A to 27H, is approximately 60°. The first to sixth cylinders 27A to 27H can be ignited sequentially in that order. However, other ignition sequencing can also be used.

For example, one (right) bank 25 of the banks 24, 25 can be formed by the first, fourth, sixth and seventh cylinders 27A, 27D, 27F and 27G. The cylinders 27A, 27D, 27F, 27G can be arranged in the downward direction in that order. The other (left) bank 24 can be formed by the eighth, third, fifth and second cylinders 27H, 27C, 27E and 27B. The cylinders 27H, 27C, 27E, 27B can be arranged in the downward direction in that order. The first to eighth cylinders 27A to 27H can be arranged in the downward direction in order of the first cylinder 27A, the eighth cylinder 27H, the fourth cylinder 27D, the third cylinder 27C, the sixth cylinder 27F, the fifth cylinder 27E, the seventh cylinder 27G and the second cylinder 27B.

The crankshaft 22 can include a main shaft 30, crank arms 31 and first to sixth crankpins 32A to 32H, the arms 31 and respective pins 32A to 32H forming "throws" of the crankshaft. The main shaft 30 can be positioned about the axis 21, and can have journals supported by the crankcase 23.

The crank arms 31 project from the crank main shaft 30. The first to eighth crankpins 32A to 32H can be supported by the respective crank arms 31, and associated respectively with the first to eighth cylinders 27A to 27H. The first to eighth crankpins 32A to 32H can be arranged in the downward direction in order of the first crankpin 32A, the eighth crankpin 32H, the fourth crankpin 32D, the third crankpin 32C, the sixth crankpin 32F, the fifth crankpin 32E, the seventh crankpin 32G and the second crankpin 32B.

Each of first to eighth cylinders 27A to 27H includes a piston 35 and a connecting rod 36. The piston 35 can be fitted in a cylinder bore 34 of each cylinder in a manner sliding axially therealong. The connecting rod 36 operatively connects the piston 35 and the first to eighth crankpin 32A to 32H of the crankshaft 22.

Each cylinder 27 can have intake and exhaust ports 38 and 39 for communicating the inside and the outside of the cylinder bore 34. Intake and exhaust valves 40 and 41 can be provided for selectively opening and closing the intake and exhaust ports 38 and 39, respectively. The intake and exhaust valves 40 and 41 can be selectively opened and closed in response to a certain crank angle ($\theta$) by a valve device (not shown) operatively connected to the crankshaft 22. However, other types of valve devices or drives can also be used, including variable valve timing systems.

The intake device 17 can include intake pipes 44 extending from the respective cylinders 27, and throttle valves 45 can be attached to the extended ends of the intake pipes 44. However, other types of systems can be sued with more or fewer throttle valves, including systems with no throttle valve at all. Such a system can use variable valve timing to meter induction air into the engine 11.

Each intake pipe 44 can have an intake passage 46 defined therein which communicates the ambient atmosphere to the intake port 38 through the throttle valve 45. The throttle valve 45 is configured to adjust the opening of the intake passage 46 at the extended end of the intake pipe 44, and thus "meter" an amount of air flowing therethrough.

Referring to FIGS. 1 to 9, the exhaust device 19 can include an exhaust manifold 47 extending from the cylinders 27. The exhaust manifold 47 can have an exhaust passage 48 defined therein which communicates the exhaust ports 39 to the ambient atmosphere.

The exhaust manifold 47 can also include first to eighth upstream exhaust pipes 49A to 49H, first to fourth midway exhaust pipes 50A to 50D and a downstream exhaust pipe 51. The first to eighth upstream exhaust pipes 49A to 49H can extend individually from the first to eighth cylinders 27A to 27H, respectively.

The first to fourth midway exhaust pipes 50A to 50D can extend respectively from a joined portion of the extended ends of the first and fifth upstream exhaust pipes 49A and 49E, a joined portion of the extended ends of the second and sixth upstream exhaust pipes 49B and 49F, a joined portion of the extended ends of the third and seventh upstream exhaust pipes 49C and 49G, and a joined portion of the extended ends of the fourth and eighth upstream exhaust pipes 49D and 49H. The downstream exhaust pipe 51 connects the extended ends of the first to fourth midway exhaust pipes 50A to 50D to the ambient atmosphere (directly to the ambient atmosphere and/or indirectly to the ambient atmosphere through the water 2).

As viewed in bottom views of the engine 11 (FIGS. 3 and 5), between the projected ends of the banks 24, 25, there can be formed a V-shaped attachment surface 53. With the upstream end faces of the upstream exhaust pipes 49 of the exhaust manifold 47 joined to the attachment surface 53, the upstream exhaust pipes 49 can be mounted to the associated banks 24, 25 with fasteners 54.

Each of the first and fifth upstream exhaust pipes 49A and 49E, the second and sixth upstream exhaust pipes 49B and 49F, the third and seventh upstream exhaust pipes 49C and 49G, and the fourth and eighth upstream exhaust pipes 49D and 49H have approximately the same equivalent length. For example, the first to eighth upstream exhaust pipes 49A to 49H have approximately the same equivalent length.

Each exhaust port 39 and valve 41 combination can be configured to function as a de Laval nozzle. For example, the exhaust port 39 can have an increasing cross sectional area as it extends to the downstream direction. As a result, during the start of the valve opening motion of the exhaust valve 41, exhaust 18 flowing from the cylinder bore 34 to the exhaust port 39, can be accelerated to Mach 1 by the constriction created between the valve 41 and its seat, then further accelerated beyond Mach 1 by the diverging shape of the port 39 to thereby cause a shock wave.

The exhaust passage 48 of each upstream exhaust pipe 49 can include a diffuser structure. For example, the exhaust passage 48 can have an increasing cross sectional area as it extends toward the downstream side. The length of the upstream exhaust pipe 49 and the midway exhaust pipe 50 can be set to be sufficiently long such that the distance from the end face of the exhaust valve 41 on the cylinder bore 34 side to the downstream end of the midway exhaust pipe 50 can be about 300 mm or larger. However, other configurations and sizes can also be used.

For example, the upstream exhaust pipe 49 can have a diffuser structure, and in addition, the upstream exhaust pipe 49 and the midway exhaust pipe 50 can be relatively long. As a result, the shock wave generated in the exhaust port 39, and a portion passed over the exhaust port 39 can form a dilatational wave more efficiently. That is, the negative pressure of exhaust pulses in the exhaust port 39, the upstream exhaust pipe 49 and the midway exhaust pipe 50 can be increased.

The downstream exhaust pipe 51 can have an expansion chamber case 56 forming the upstream side thereof and can be connected to the downstream ends of the midway exhaust pipes 50. The expansion chamber case 56 can serve as a surge tank. The downstream side of the downstream exhaust pipe 51 can be formed by the above case 9.

For example, on the downstream side of the downstream exhaust pipe 51, the exhaust passage 48 can extend from the upper end face of the case 9 to the back of a lower part thereof through the space within the case 9. The lower end of the expansion chamber case 56 can be connected to the upper end face of the case 9. The lower end of the exhaust passage 48 in the expansion chamber case 56 communicates with the upper end of the exhaust passage 48 formed in the case 9.

As seen axially along the downstream ends of the midway exhaust pipes 50 (FIG. 9), in the vicinity of the downstream ends of the midway exhaust pipes 50, the expansion chamber case 56 can have a cross sectional area twice as large as or larger than twice the total cross sectional area of the downstream ends of the midway exhaust pipes 50. This provides effective damping on vibration caused by pressure pulses of the exhaust 18 flowing from the midway exhaust pipes 50 into the expansion chamber case 56, so that mutual interference of those exhaust flows can be prevented.

The inner bottom 56a of the expansion chamber case 56 can be inclined downwardly toward the upstream end of the exhaust passage 48 formed in the case 9. As a result, the water 2 that may otherwise be trapped in a bottom part in the expansion chamber case 56 will flow through the exhaust passage 48 in the case 9 to be drained.

An idling exhaust passage 57 can be formed in the case 9 (FIG. 2) for communicating longitudinal midway parts of the exhaust passage 48 in the downstream exhaust pipe 51 and the midway exhaust pipes 50 and to the ambient atmosphere on the surface of the water 2.

The upstream exhaust pipes 49, the midway exhaust pipes 50 and the expansion chamber case 56 of the downstream exhaust pipe 51 of the exhaust manifold 47 can have individual water jackets 58. Cooling water can be pumped through the water jackets 58. As such, the water jackets 58 can prevent the temperature of the exhaust manifold 47 from increasing due to the exhaust 18.

Figure 7:
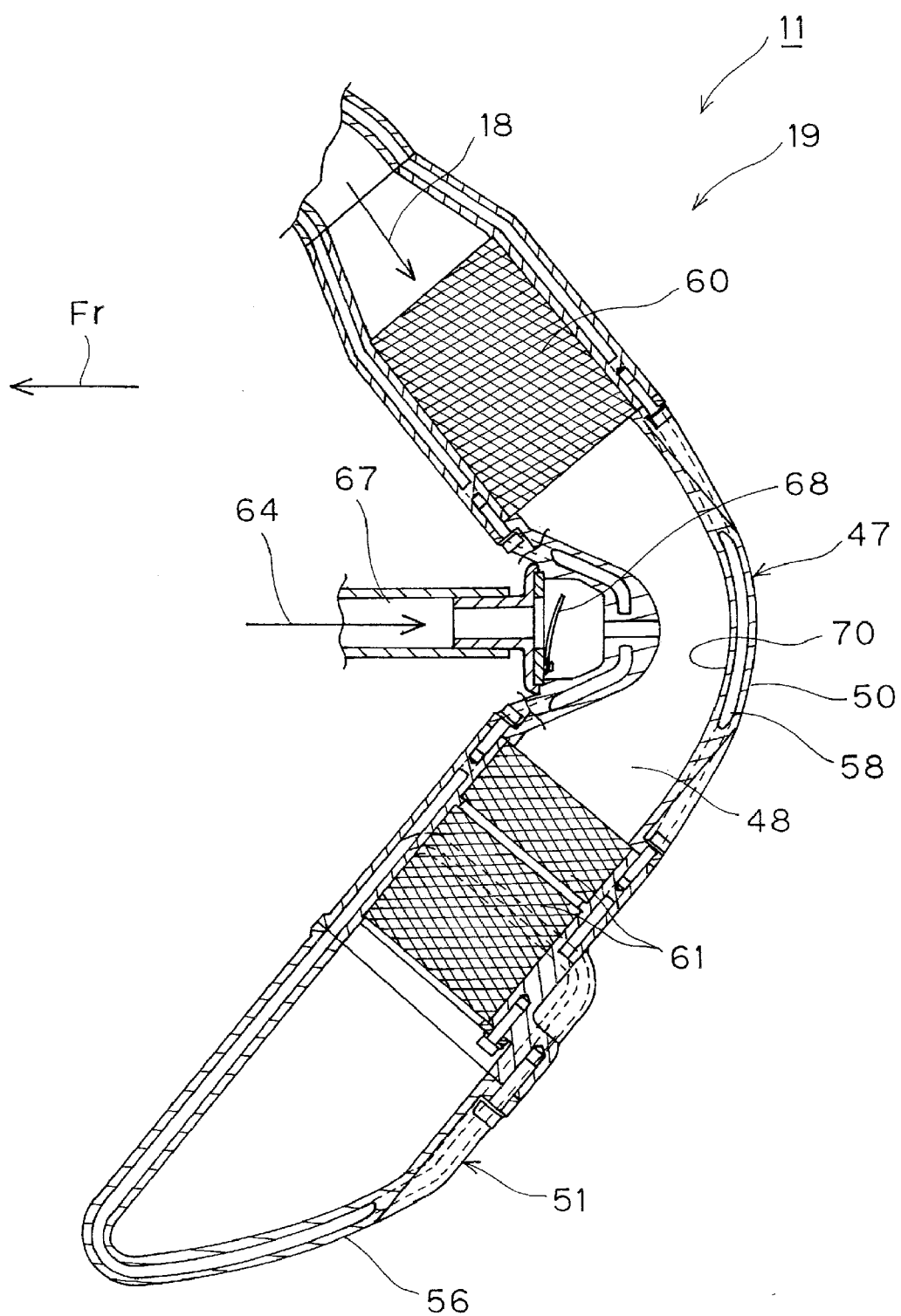
FIG. 7 is an enlarged sectional view of a portion of FIG. 3.
Figure 8:
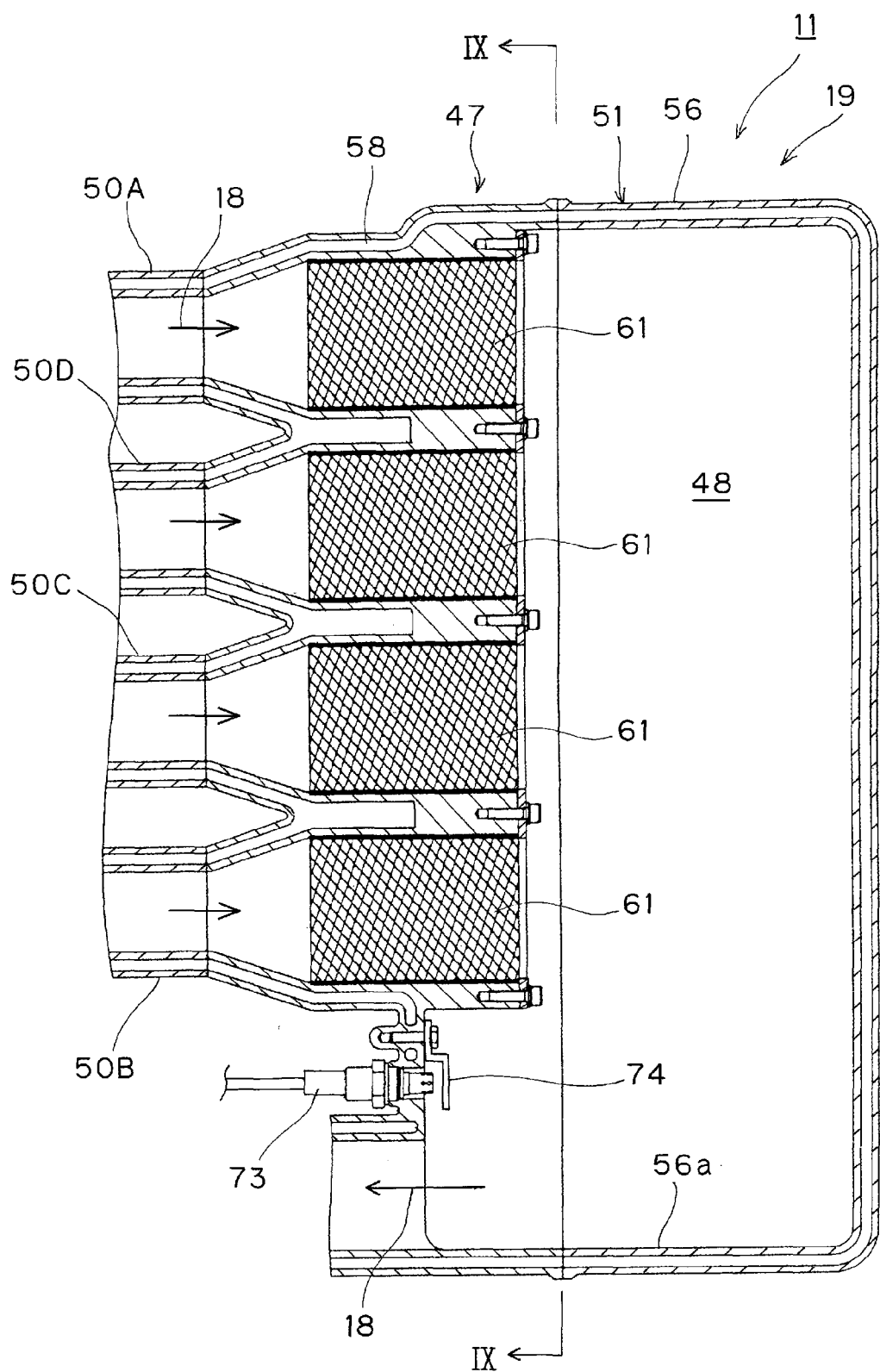
FIG. 8 is a partial sectional view of FIG. 6.
Figure 9:
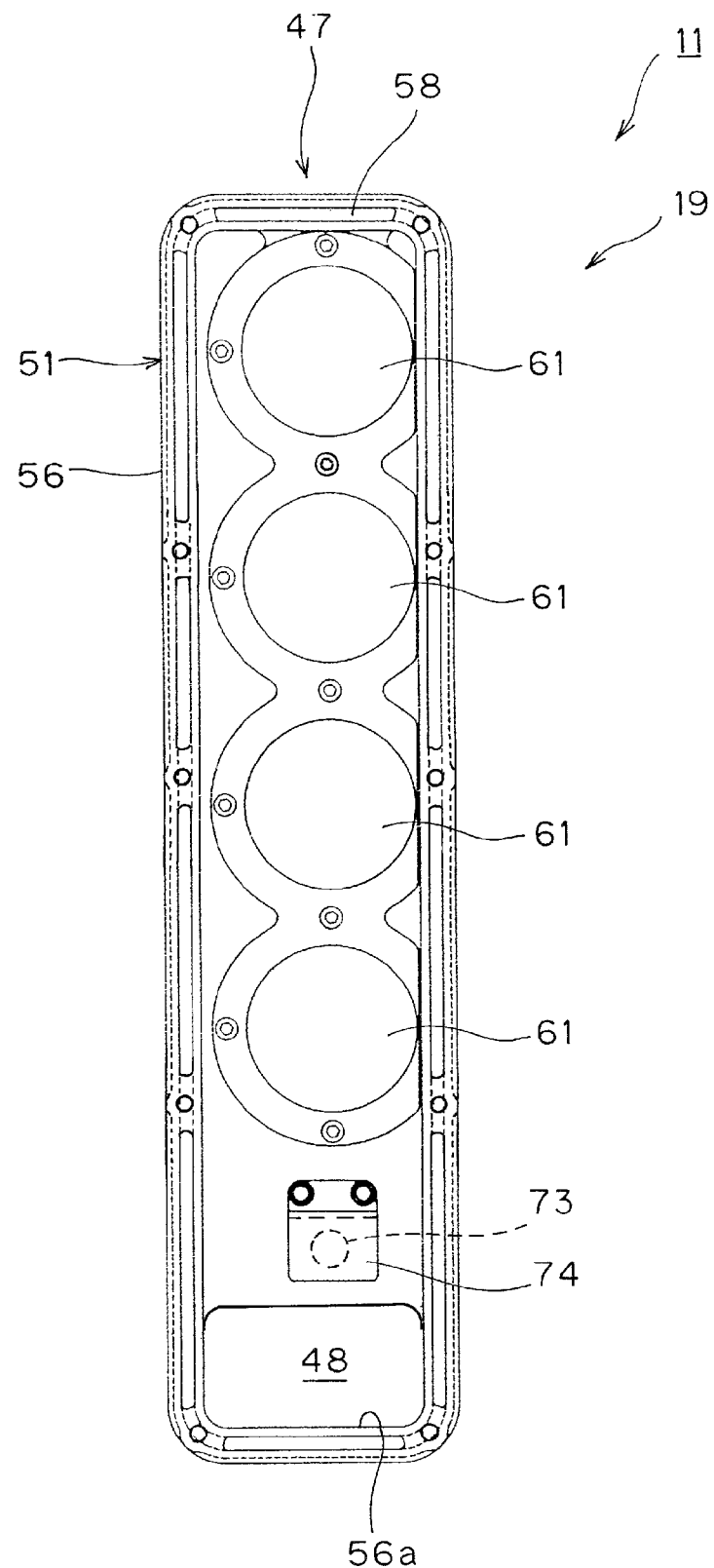
FIG. 9 is a sectional view taken along the line IX-IX in FIG. 8.

The exhaust passage 48 can have a plurality (two or more) of catalysts 60, 61 disposed therein longitudinally. The catalysts 60, 61 can be three-way catalysts for purifying exhaust 18. For example, each midway exhaust pipe 50 can be curved rearward in a convex shape, and in an L-shape as a whole, as viewed in bottom views of the engine 11 (FIGS. 3 and 7). The upstream catalyst 60 can be disposed upstream of the curved part of the midway exhaust pipe 50 in the exhaust passage 48. The downstream catalyst 61 can be disposed downstream of the curved part of the midway exhaust pipe 50 in the exhaust passage 48. The catalysts 60, 61 have a longitudinal length longer than a radial length in the exhaust passage 48. However, other configurations can also be used.

First and second secondary airs 63 and 64 can be respectively supplied to the upstream sides of the catalysts 60, 61 in the exhaust passage 48. For example, referring to FIGS. 1 and 5, each cylinder 27 can be provided with a first air passage 65 and a reed valve 66 so that the first secondary air 63 can be supplied to the upstream side of the exhaust port 39. That is, the first secondary air 63 can be supplied to the upstream side of both the catalysts 60, 61 in the exhaust passage 48.

Referring to FIGS. 1 and 7, a second air passage 67 and a reed valve 68 can be provided so that the second secondary air 64 can be supplied to the curved part of the midway exhaust pipe 50 between the catalysts 60, 61 in the exhaust passage 48. That is, the second secondary air 64 can be supplied to the upstream side of the downstream catalyst 61 of the catalysts 60, 61 in the exhaust passage 48.

In the curved part of the midway exhaust pipe 50, there can be formed a bottleneck part 70 where the cross sectional area of the flow of exhaust 18 can be decreased temporarily. As a result, the flow speed of the exhaust 18 through the bottleneck part 70 increases, and thus a higher negative pressure can be generated via the venturi effect. The second secondary air 64 can be supplied to a portion of the bottle neck part 70 having the smallest cross sectional area, through the second air passage 67. Thus, due to the negative pressure generated at the bottleneck part 70, the second secondary air 64 can be sucked smoothly into the exhaust passage 48 in the midway exhaust pipe 50 through the second air passage 67. That is, a larger amount of secondary air 64 can be supplied to the exhaust passage 48.

The downstream end of the second air passage 67 can communicate with a portion of the exhaust passage 48 having the smallest radius of curvature in the curved part of the midway exhaust pipe 50. The exhaust 18 flowing through the exhaust passage 48 tends to flow by a larger amount along a portion of the exhaust passage 48 having the largest radius of curvature due to its inertial force. Thus, a relatively high negative pressure can be generated in the portion of the exhaust passage 48 having the smallest radius of curvature. Accordingly, due to the negative pressure, the second secondary air 64 can be sucked smoothly into the exhaust passage 48 in the midway exhaust pipe 50 through the second air passage 67. That is, a larger amount of secondary air 64 can be supplied to the exhaust passage 48.

First $O_2$ sensors 72 and a second $O_2$ sensor 73 can also be provided. The first $O_2$ sensor 72 can be disposed upstream of the catalysts 60, 61, and can be configured to detect the components (concentration of oxygen) of the exhaust 18 flowing through the upstream end of the midway exhaust pipe 50. The second $O_2$ sensor 73 can be disposed downstream of the catalysts 60, 61, and can be configured to detect the components of the exhaust 18 flowing through the downstream end of the expansion chamber case 56.

A cover 74 can be provided for covering the second $O_2$ sensor 73 from above. As a result, water droplets are prevented from falling onto the $O_2$ sensor 73. Accordingly, the $O_2$ sensor can be protected from damage due to water droplets.

Based on the detection signals from the $O_2$ sensors 72, 73, the opening of the intake passage 46 adjusted by the throttle valve 45, the fuel supply amount, and the supply amount of secondary airs 63, 64 can be controlled automatically. Due to such control, an exhaust air-fuel ratio which can be proper for the catalysts 60, 61 can be set to a desired value for enhanced purification of the exhaust 18.

When the engine 11 is driven, the crankshaft 22 makes rotation (R), and the first to eighth cylinders 27A to 27H can be ignited sequentially in that order. The ignitions can be performed at predetermined intervals of crank angle (θ), preferably at a 90°. It is understood, however, that the ignitions may not be performed at predetermined intervals but a plurality of (two) cylinders may be ignited almost simultaneously.

Exhaust flows 18 are discharged sequentially from the cylinders 27 through the exhaust manifold 47 in the same order as the cylinders 27 are ignited. When the engine 11 is in a normal operating state such as at full load, the pressure of the exhaust 18 can be relatively high and the amount of the exhaust 18 can be relatively large. Thus, most of the exhaust 18 can be discharged into the water 2 against water pressure through the exhaust passage 48 of the exhaust manifold 47. A small amount of the rest of the exhaust 18 can be discharged to the ambient atmosphere through the idling exhaust passage 57. The rotation (R) of the crankshaft 22 by the operation of the engine drives the propeller 10 via the power transmission apparatus 12 to thereby propel the watercraft 1.

When the engine 11 is idle, the pressure of the exhaust 18 can be relatively low and the amount of the exhaust can be relatively small. Thus, due to water pressure, the exhaust 18 can be prevented from being discharged into the water 2 through the exhaust passage 48 of the exhaust manifold 47, and thus most of the exhaust 18 can be discharged to the ambient atmosphere through the idling exhaust passage 57.

With the above structure, the exhaust manifold 47 includes the first to eighth upstream exhaust pipes 49A to 49H extending respectively from the first to eighth cylinders 27A to 27H. The first to fourth midway exhaust pipes 50A to 50D extend respectively from a joined portion of the extended ends of the first and fifth upstream exhaust pipes 49A and 49E, a joined portion of the extended ends of the second and sixth upstream exhaust pipes 49B and 49F, a joined portion of the extended ends of the third and seventh upstream exhaust pipes 49C and 49G, and a joined portion of the extended ends of the fourth and eighth upstream exhaust pipes 49D and 49H. The downstream exhaust pipe 51 connects the extended ends of the first to fourth midway exhaust pipes 50A to 50D to the ambient atmosphere.

As a result, exhaust 18 from the first cylinder 27A, for example, flows through the first upstream exhaust pipe 49A and the first midway exhaust pipe 50A to the downstream exhaust pipe 51. Next, exhaust 18 from the second cylinder 27B flows through the second upstream exhaust pipe 49B and the second midway exhaust pipe 50B to the downstream exhaust pipe 51. Next, exhaust 18 from the third cylinder 27C flows through the third upstream exhaust pipe 49C and the third midway exhaust pipe 50C to the downstream exhaust pipe 51. Next, exhaust 18 from the fourth cylinder 27D flows through the fourth upstream exhaust pipe 49D and the fourth midway exhaust pipe 50D to the downstream exhaust pipe 51. Thus, the subsequent exhaust pulses or "amounts" 18 sequentially discharged from the second to fourth cylinders 27B to 27D can be prevented from interfering with the exhaust pulses or "amounts" 18 from the first cylinder 27A in the upstream exhaust pipes 49 and the midway exhaust pipes 50.

The first cylinder 27A and the fifth cylinder 27E can be positioned in proximity to each other because the first and fifth upstream exhaust pipes 49A and 49E, extend from the first cylinder 27A and the fifth cylinder 27E, and can be joined to each other. However, the ignition interval between the first cylinder 27A and the fifth cylinder 27E can be significantly long due to ignitions of the second to fourth cylinders 27B to 27D occurring therebetween. As a result, overlapping of the exhaust periods of the first cylinder 27A and the fifth cylinder 27E can be prevented. Thus, the exhaust 18 from the fifth cylinder 27E can be prevented from interfering with the exhaust 18 from the first cylinder 27A in the first and fifth upstream exhaust pipes 49A and 49E.

The above description of the exhaust 18 from the first cylinder 27A can be applied to the exhaust pulses or amounts 18 from the cylinders 27 other than the first cylinder 27A. As a result, interference of the exhausts in the engine 11 can be prevented, and thus desired exhaust pulses having a sufficiently high negative pressure can be obtained. Therefore, the enhanced performance of the engine 11 can be achieved more reliably.

As described above, the catalysts 60, 61 for purifying exhaust can be disposed in the exhaust passage 48 in the exhaust manifold 47. The first air passage 65 can be formed for supplying first secondary air 63 to the upstream side of the catalysts 60, 61 in the exhaust passage 48. In addition to the first air passage 65 for the first secondary air 63, the second air passage 67 can be formed for supplying second secondary air 64 to the upstream side of the downstream catalyst 61 of the catalysts 60, 61 in the exhaust passage 48.

As described above, since exhaust pulses having a sufficiently high negative pressure can be obtained, first and second secondary airs 63 and 64 can be sucked more smoothly into the exhaust passage 48 due to the negative pressure. That is, a larger amount of first and second secondary airs 63, 64 can be supplied into the exhaust passage 48. Thus, even when the air-fuel ratio (A/F) of the mixture to be supplied to the engine body 15 of the engine 11 by the intake device 17 is small (rich), the exhaust air-fuel ratio on the upstream side of the catalysts 60, 61 can be set to a desired value such as a theoretical air-fuel ratio. More reliable purification of exhaust 18 can be thereby achieved. That is, as a result of such purification of exhaust 18, the enhanced performance of the engine 11 can be achieved more reliably.

As described above, the catalysts 60, 61 can have a longitudinal length longer than a radial length in the exhaust passage 48.

In some embodiments, the above engine 11 can be incorporated in the outboard motor 4. Compared to the case where the engine 11 is incorporated in a commercially available automobile, the engine 11 incorporated into an outboard motor will often be operated at a maximum output point under full load. As a result, the flow speed of exhaust 18 in the exhaust passage 48 becomes relatively high. Thus, in such embodiments, the catalysts 60, 61 can have a longer length as described above. This ensures that the exhaust 18 is exposed to the catalysts 60, 61 for a longer amount of time. As a result, more reliable purification of the exhaust 18 can be achieved. That is, the enhanced performance of the engine 11 can be achieved more reliably.

It is understood that the foregoing description is based on the illustrated example, and the banks 24, 25 may be arranged in a laterally inverse form. The arrangement of the first to fourth midway exhaust pipes 50A to 50D in the downward direction can be determined optionally.

FIGS. 10 to 14 illustrate a modification of the engine 11 described above. The components, functions and effects of this modification are similar in many respects to those of the above-described features of the engine 11. Therefore, those parts corresponding to the components described above are identified with the same reference numerals in the drawings and their description is not repeated, and their differences are mainly described below. The configurations of the parts of the various embodiments described herein can be combined in various ways, as is understood by those of ordinary skill in this art.

Figure 10:
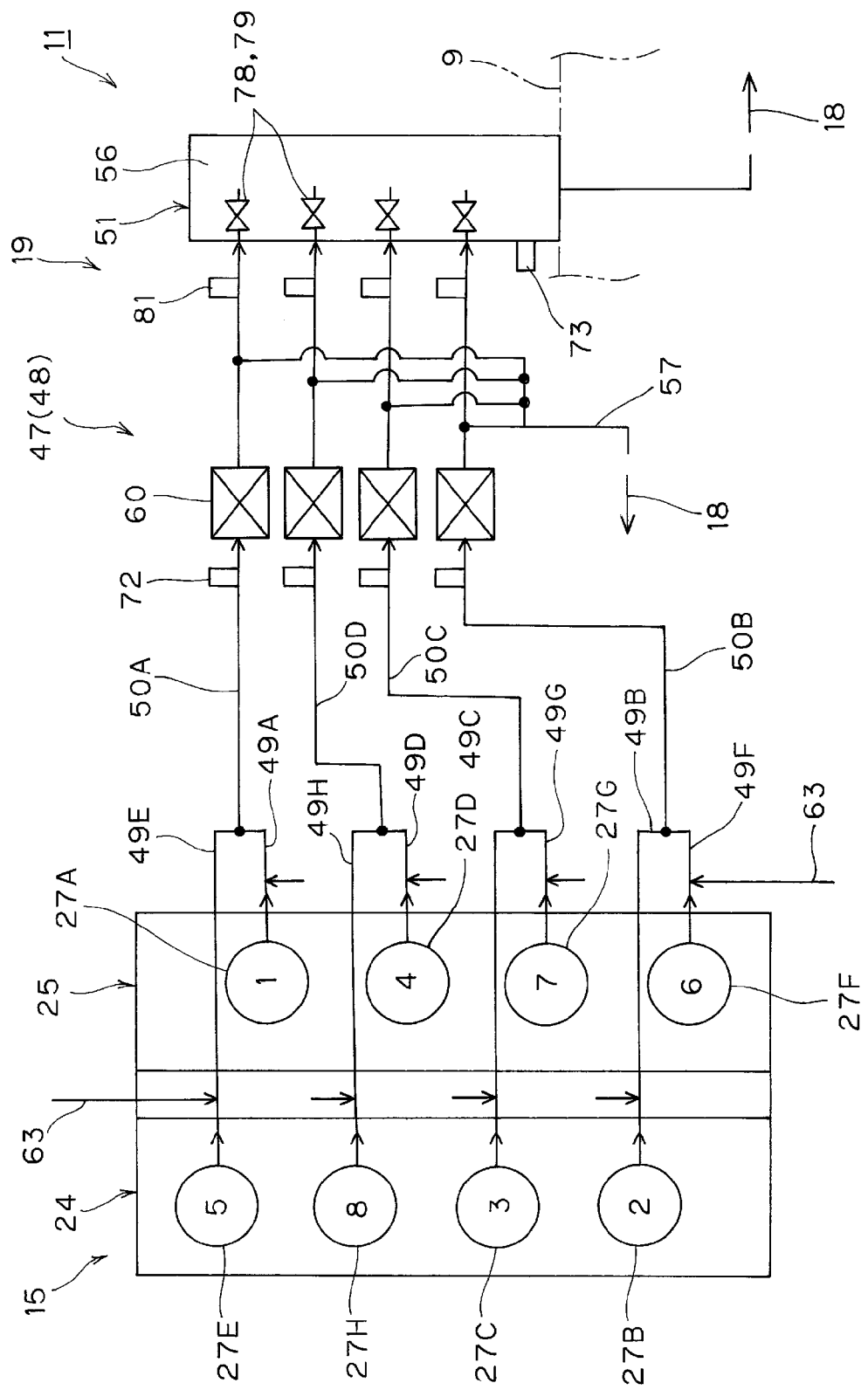
FIG. 10 is a schematic diagram generally illustrating a modification of the engine of FIG. 1.
Figure 11:
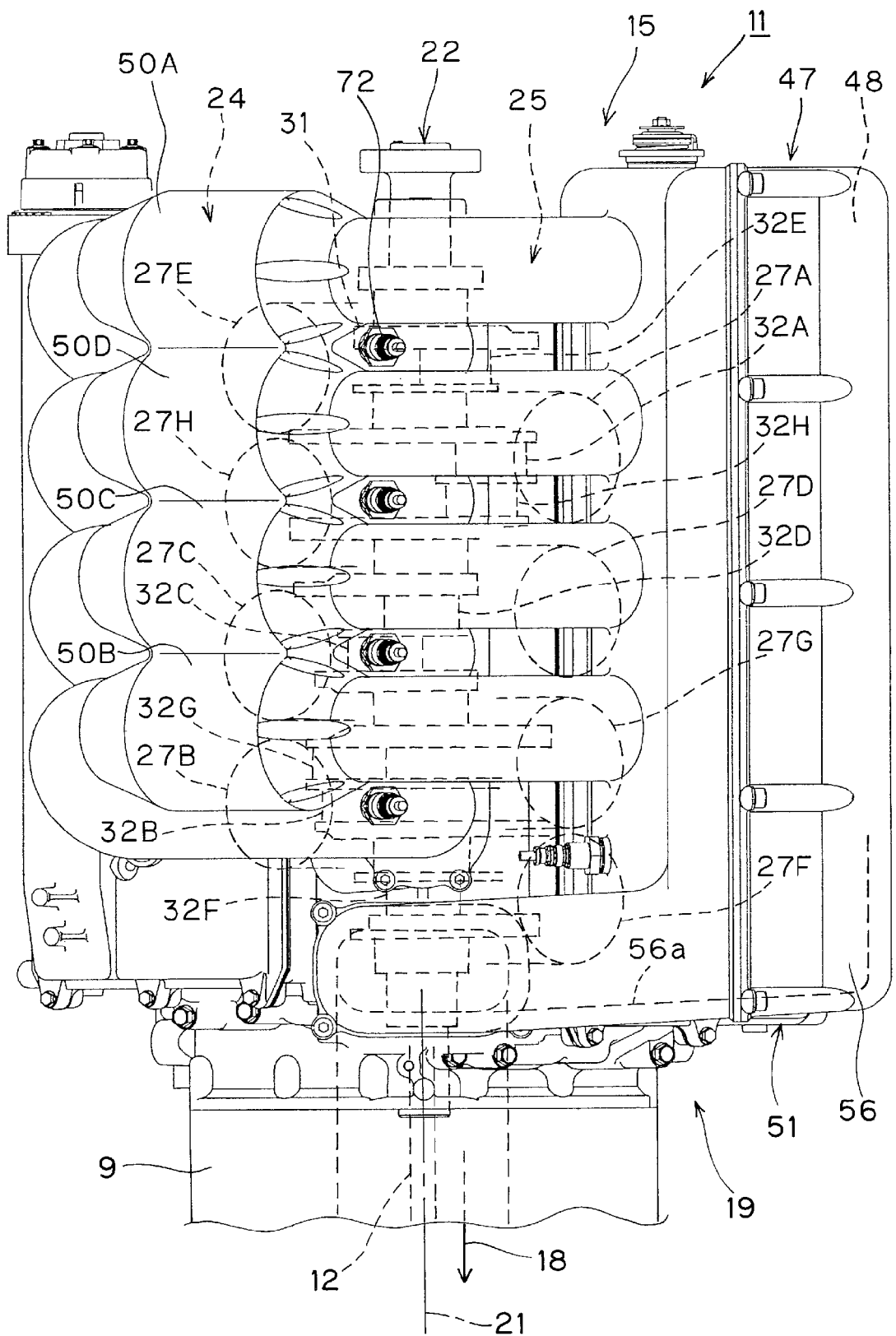
FIG. 11 is a rear elevational view of the engine of FIG. 10 including a portion of the exhaust system.
Figure 12:
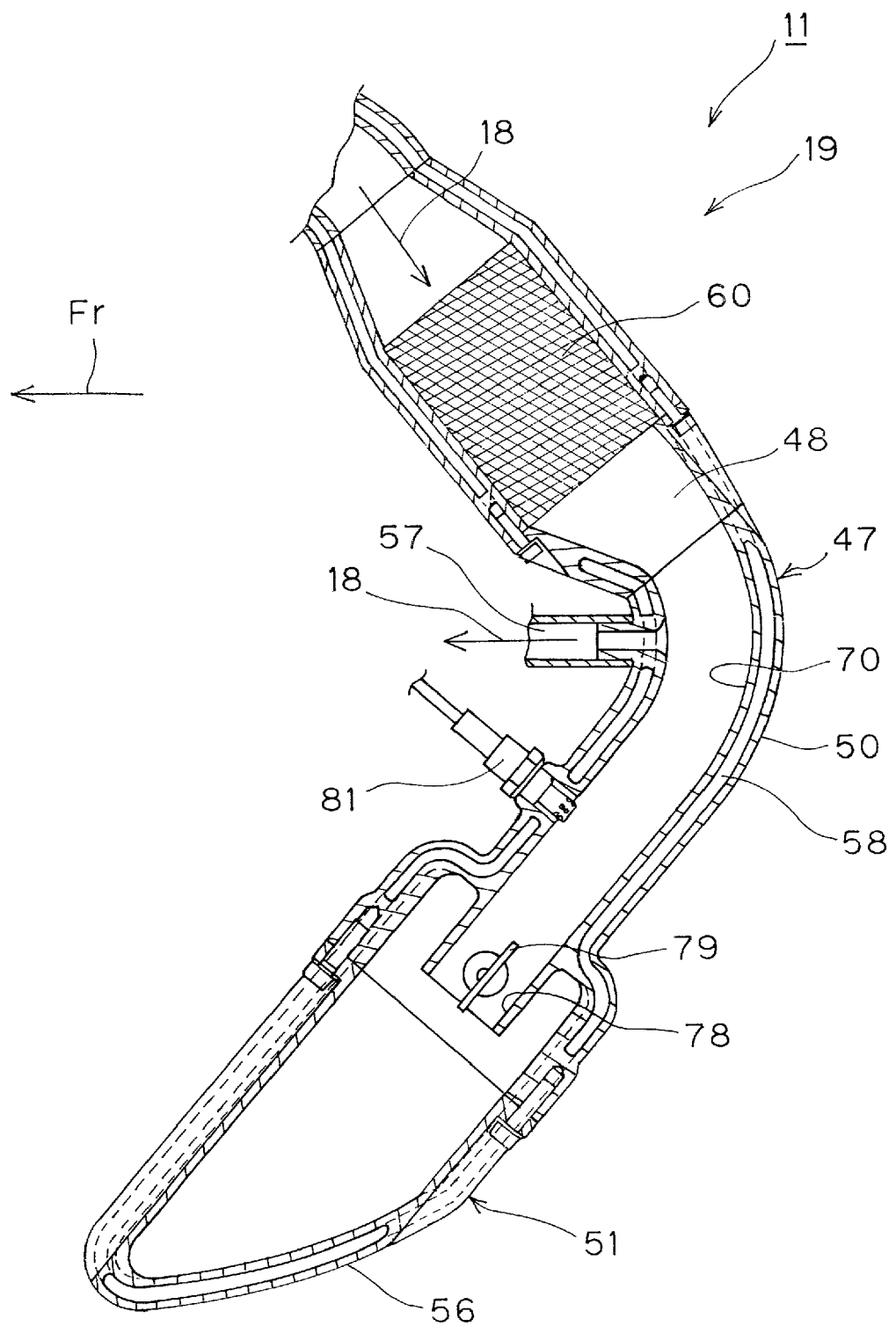
FIG. 12 is an enlarged sectional view of a portion of the exhaust system shown in FIG. 11.
Figure 13:
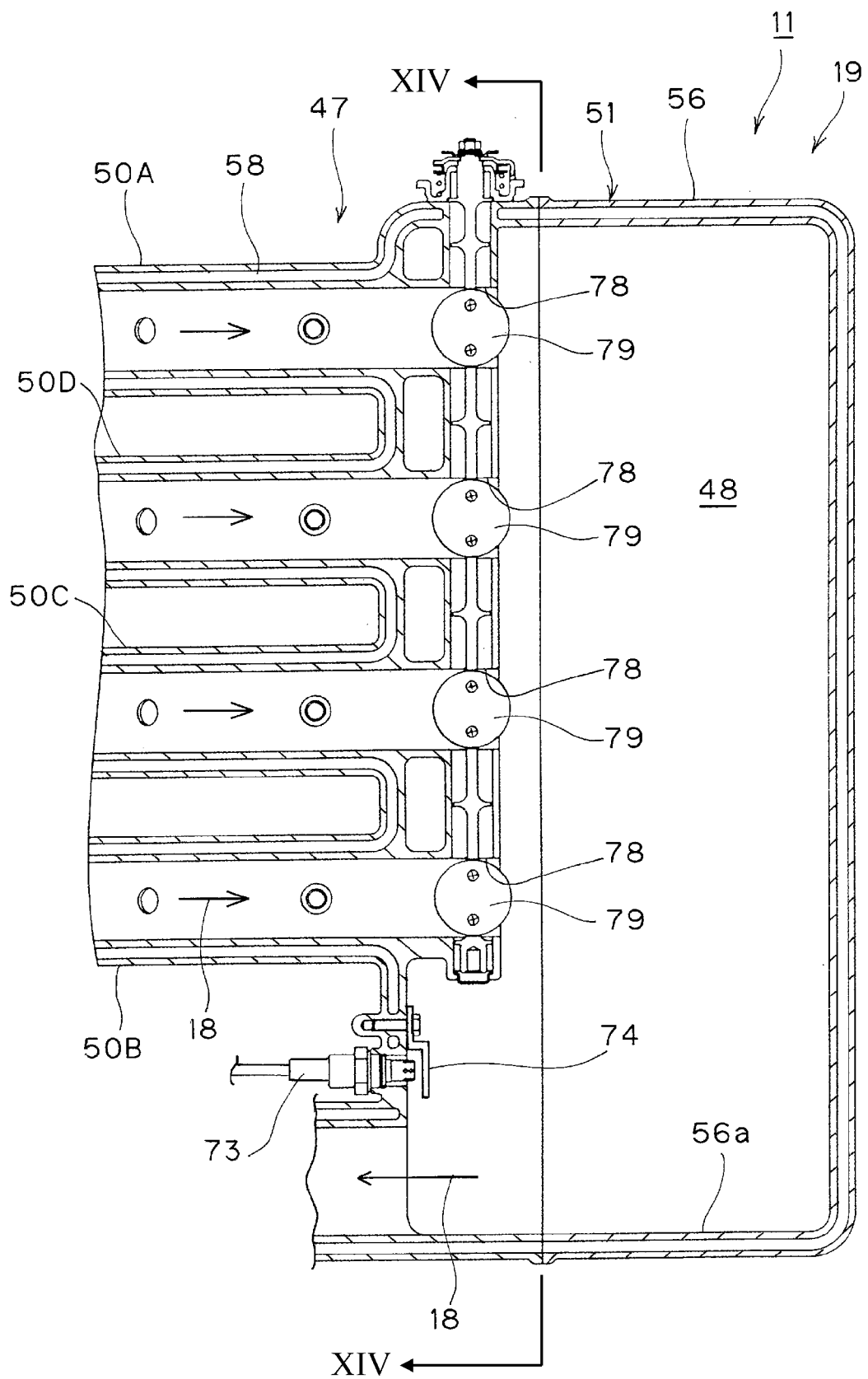
FIG. 13 is a partial sectional view of FIG. 11.
Figure 14:
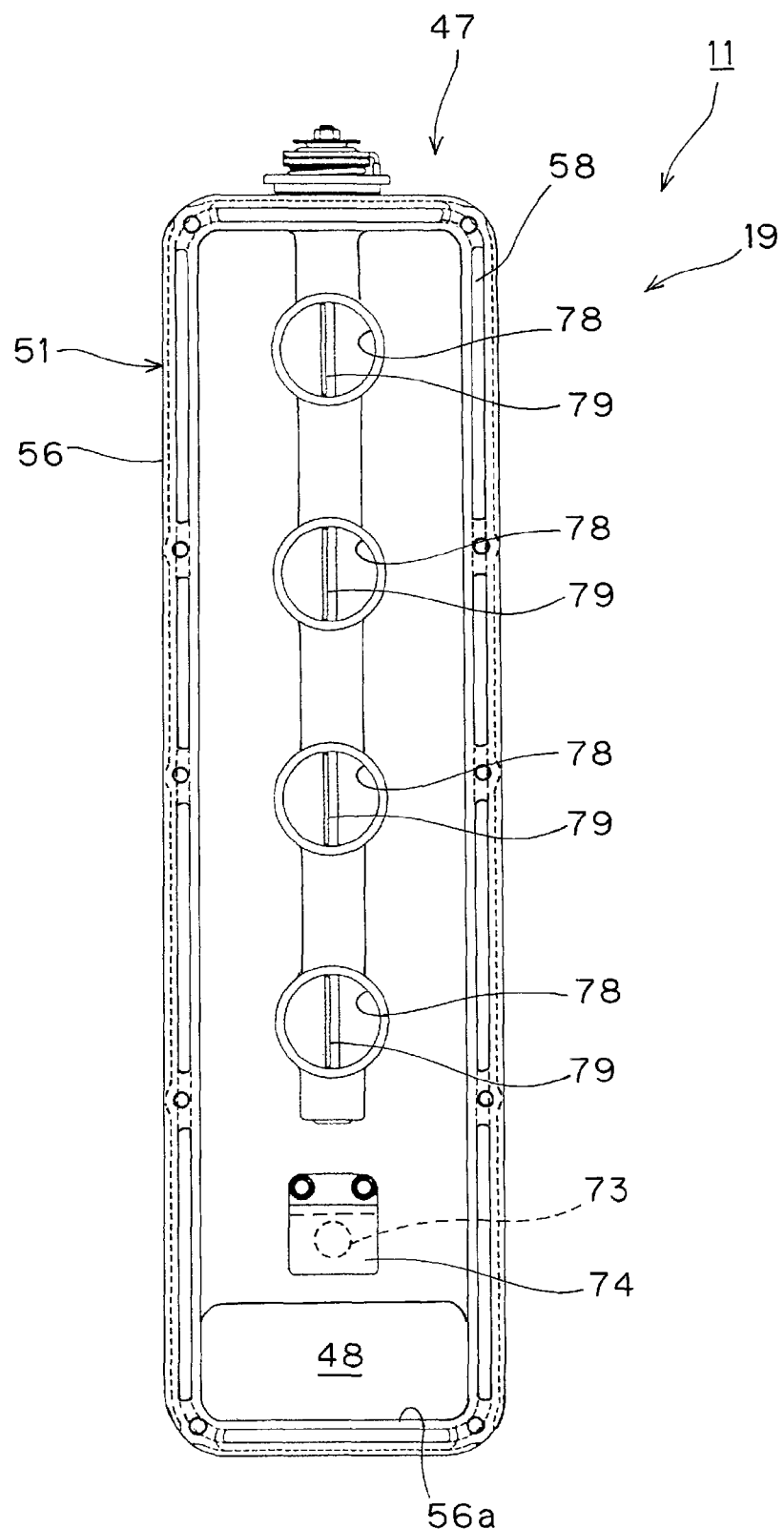
FIG. 14 is a sectional view taken along the line XIV-XIV in FIG. 13.

Referring to FIG. 10, each pair of the first and fifth cylinders 27A and 27E, the second and sixth cylinders 27B and 27F, the third and seventh cylinders 27C and 27G, and the fourth and eighth cylinders 27D and 27H can be adjacent to each other axially along the crankshaft 22. The first to eighth cylinders 27A to 27H can be arranged in the downward direction in order of the fifth cylinder 27E, the first cylinder 27A, the eighth cylinder 27H, the fourth cylinder 27D, the third cylinder 27C, the seventh cylinder 27G, the second cylinder 27B and the sixth cylinder 27F.

The idling exhaust passage 57 can connect longitudinal "midway parts" of the exhaust passage 48 in the midway exhaust pipes 50 of the exhaust manifold 47 to the ambient atmosphere on the surface of the water 2.

Regulating parts 78 can be formed at "parts" of the exhaust passage 48 on the downstream side of the "midway parts" of the exhaust passage 48. For example, the "parts" of the exhaust passage 48 correspond to the downstream ends of the midway exhaust pipes 50. The opening of the respective regulating parts 78 can be made variable by a plurality of (four) butterfly regulating valves 79 individually provided at the downstream ends of the midway exhaust pipes 50. The regulating valves 79 can be operatively connected to each other to selectively open and close together. An actuator (not shown) can be provided for moving the regulating valves. It is understood that the regulating valves 79 may be moved individually.

Third $O_2$ sensors 81 can also be provided. The third $O_2$ sensor 81 can be configured to detect the components of exhaust 18 flowing through the midway exhaust pipe 50 on the downstream side of the catalyst 60 and the idling exhaust passage 57.

With the above structure, the first to eighth cylinders 27A to 27H form the banks 24, 25 in a V-configuration. One bank 25 of the banks 24, 25 can be formed by the first, fourth, seventh and sixth cylinders 27A, 27D, 27G and 27F, and the other bank 24 can be formed by the fifth, eighth, third and second cylinders 27E, 27H, 27C and 27B. Each of the first and fifth cylinders 27A and 27E, the second and sixth cylinders 27B and 27F, the third and seventh cylinders 27C and 27G, and the fourth and eighth cylinders 27D and 27H can be adjacent to each other axially along the crankshaft 22.

For example, the first and fifth cylinders 27A and 27E can be separated into the banks 24, 25, respectively, and can be adjacent to each other axially along the crankshaft 22. As a result, the first and fifth upstream exhaust pipes 49A and 49E, extending respectively from the first and fifth cylinders 27A and 27E and joined to each other at their extended ends, can be shorter in length and simpler in form. The same description as made to the first and fifth cylinders 27A and 27E can be applied to the second and sixth cylinders 27B and 27F, the third and seventh cylinders 27C and 27G, and the fourth and eighth cylinders 27D and 27H. Therefore, the engine 11 can be more compact and have a simplified structure. This is especially advantageous for the outboard motor body 5 strongly needed to be more compact.

As described above, the regulating part 78 can be provided for varying the opening of the "part" of the exhaust passage 48 on the downstream side of the "midway part" of the exhaust passage 48.

As a result, firstly, proper adjustment of the opening of the regulating part 78 according to the operating state of the engine 11 allows the pressure of the exhaust 18 flowing through the midway exhaust pipe 50 to be reversed by the regulating part 78, so that exhaust pulses having desired negative pressure can be obtained at desired timing. Thus, enhanced performance of the engine 11 can be achieved.

Secondly, when the hull 3 is driven rearwardly in response to the operation of the switching device 14 of the power transmission apparatus 12 in the outboard motor 4, the water 2 may flow back through the exhaust passage 48 of the downstream exhaust pipe 51 and enter the idling exhaust passage 57, due to the dynamic pressure of the water 2. In this case, since both the exhaust passages 48, 57 are obstructed, the engine 11 may lose speed or stop.

Thus, in response to the operation of the switching device 14 to drive the hull 3 rearward, if automatic control, manual operation or the like is performed to close the regulating valve 79 to decrease the opening of the regulating part 78, the entry of the water 2 into the idling exhaust passage 57 can be prevented by the regulating part 78. Thus, the flow of exhaust 18 at least through the idling exhaust passage 57 can be ensured. As a result, the engine 11 can be prevented from losing speed or stopping due to backflow of the water 2 through the exhaust passage 48. Advantageously, the stable operation of the engine 11 can be continuously effected.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An exhaust device of an eight-cylinder engine comprising:
    an exhaust manifold extending from the-first, second, third, fourth, fifth, sixth, seventh, and eighth cylinders ignited in that order, the exhaust manifold comprising:
        first, second, third, fourth, fifth, sixth, seventh, and eighth upstream exhaust pipes extending respectively from the first, second, third, fourth, fifth, sixth, seventh, and eighth cylinders;
        first, second, third, and fourth midway exhaust pipes extending respectively from a joined portion of extended ends of the first and fifth upstream exhaust pipes, a joined portion of extended ends of the second and sixth upstream exhaust pipes, a joined portion of extended ends of the third and seventh exhaust pipes, and a joined portion of extended ends of the fourth and eighth upstream exhaust pipes; and
        a downstream exhaust pipe for connecting extended ends of the first, second, third, and fourth midway exhaust pipes to the ambient atmosphere.

2. The exhaust device of an eight-cylinder engine according to claim 1, wherein the cylinders form banks in a V-configuration, one of the banks being formed by the first, fourth, sixth and seventh cylinders, and the other bank being formed by the second, third, fifth and eighth cylinders, each pair of the first and fifth cylinders, the second and sixth cylinders, the third and seventh cylinders, and the fourth and eighth cylinders are adjacent to each other axially along a crankshaft of the engine.

3. The exhaust device of an eight-cylinder engine according to claim 1 additionally comprising a catalyst disposed in an exhaust passage in the exhaust manifold for purifying exhaust, and an air passage for supplying secondary air to the upstream side of the catalyst in the exhaust passage.

4. The exhaust device of an eight-cylinder engine according to claim 2 additionally comprising a catalyst disposed in an exhaust passage in the exhaust manifold for purifying exhaust, and an air passage for supplying secondary air to the upstream side of the catalyst in the exhaust passage.

5. The exhaust device of an eight-cylinder engine according to claim 4, wherein the catalyst has a longitudinal length longer than a radial length in the exhaust passage.

6. The exhaust device of an eight-cylinder engine according to claim 1, in combination with an outboard motor, and further comprising an idling exhaust passage connecting a midway part of the exhaust passage in the exhaust manifold to the ambient atmosphere on the surface of water, and a regulating part configured to vary the opening of a part of the exhaust passage on the downstream side of the midway part of the exhaust passage.

7. An engine comprising:
    first, second, third, fourth, fifth, sixth, seventh, and eighth cylinders ignited in that order;
    an exhaust manifold extending from the first, second, third, fourth, fifth, sixth, seventh, and eighth cylinders, the exhaust manifold comprising:
        first, second, third, fourth, fifth, sixth, seventh, and eighth upstream exhaust pipes extending respectively from the first, second, third, fourth, fifth, sixth, seventh, and eighth cylinders;
        first, second, third and fourth midway exhaust pipes extending respectively from a first joined portion of ends of the first and fifth upstream exhaust pipes, a second joined portion of ends of the second and sixth upstream exhaust pipes, and a third joined portion of ends of the third and seventh upstream exhaust pipes, and a fourth joined portion of ends of the fourth and eighth upstream exhaust pipes; and
        a downstream exhaust pipe connecting extended ends of the first, second, third, and fourth midway exhaust pipes to the ambient atmosphere.

8. The engine according to claim 7, wherein the first, second, third, fourth, fifth, and sixth, seventh, and eighth cylinders form banks in a V-configuration, one of the banks being formed by the first, fourth, seventh, and sixth cylinders, and the other bank being formed by the fifth, eighth, third, and second, cylinders, and wherein each pair of the first and fifth cylinders, the second and sixth cylinders, the third and seventh cylinders, and the fourth and eighth cylinders are adjacent to each other axially along a crankshaft of the engine.

9. The engine according to claim 7, further comprising a catalyst disposed in an exhaust passage in the exhaust manifold and configured to purify the exhaust, and an air passage configured to supply secondary air to the upstream side of the catalyst in the exhaust passage.

10. The engine according to claim 8, further comprising a catalyst disposed in an exhaust passage in the exhaust manifold and configured to purify the exhaust, and an air passage configured to supply secondary air to the upstream side of the catalyst in the exhaust passage.

11. The engine according to claim 10, wherein the catalyst has a longitudinal length longer than its radial length in the exhaust passage.

12. The engine according to claim 7, in combination with an outboard motor, and further comprising an idling exhaust passage connecting a midway part of the exhaust passage in the exhaust manifold to the ambient atmosphere on the surface of water, and a regulating part configured to vary the opening of a part of the exhaust passage on the downstream side of the midway part of the exhaust passage.

* * * * *